United States Patent [19]

Minor et al.

[11] Patent Number: 5,740,252
[45] Date of Patent: Apr. 14, 1998

[54] APPARATUS AND METHOD FOR PASSING PRIVATE DEMOGRAPHIC INFORMATION BETWEEN HYPERLINK DESTINATIONS

[75] Inventors: Halsey M. Minor, San Francisco, Calif.; Munish Gandhi, Bridgewater, N.J.; William E. Headapohl, San Francisco, Calif.; Jonathan Rosenberg, Annandale, N.J.

[73] Assignee: C/NET, Inc., San Francisco, Calif.

[21] Appl. No.: 542,564

[22] Filed: Oct. 13, 1995

[51] Int. Cl.$^6$ .................... H04L 9/00; H04L 9/32
[52] U.S. Cl. .................... 380/49; 380/9; 380/21; 380/23; 380/25
[58] Field of Search .................... 380/4, 9, 21, 23, 380/25, 49, 50, 59

[56] References Cited

U.S. PATENT DOCUMENTS 5,416,842  5/1995  Aziz ............................ 380/4 X

OTHER PUBLICATIONS

Copy of U.S. Census Bureau Internet Homepage And Awards Page at http:// WWW.CENSUS.gov/. No Date.
Copy of "U.S. Export Restricted Software Download FAQ" At http://WWWUS.Netscape.com-/1Eng/US-Current/faq.html, No Date.

*Primary Examiner*—Bernarr E. Gregory
*Attorney, Agent, or Firm*—Flehr Hohbach Test Albritton & Herbert LLP; William S. Galliani; Clare T. Hartnett

[57] ABSTRACT

A method of passing demographic information between computers includes the step of associating a computer operator with a set of demographic information. When the computer operator requests a transfer to another computer, a remote site information repository is accessed to identify a remote site destination address and a remote site encryption key. The demographic information is then encrypted using the remote site encryption key to form an encoded demographic signal. The encoded demographic signal is then combined with the remote site destination address to form an encoded demographic hyperlink transfer request, which is used to access the remote computer specified by the remote site destination address. The remote computer decrypts the encoded demographic information. The demographic information can be used by the remote computer in a number of ways, including the generation of a customized reply to an inquiry from the computer operator.

21 Claims, 5 Drawing Sheets

APPARATUS AND METHOD FOR PASSING PRIVATE DEMOGRAPHIC INFORMATION BETWEEN HYPERLINK DESTINATIONS

BRIEF DESCRIPTION OF THE INVENTION

This invention relates generally to hyperlink connections on computer networks. More particularly, this invention relates to a technique for appending private demographic information to a hyperlink transfer request used to move from one hyperlink computer to another hyperlink computer of a computer network.

BACKGROUND OF THE INVENTION

The term "hypertext" is used to describe documents with links to other documents. For example, a first document may include the word "Keats"; this word could then have a link to another document with the title "English Poets". These links are referred to herein as "hyperlinks". Hyperlinks are used between computers in computer networks.

A notable use of hyperlinks is on the World Wide Web (WWW) of computers. In this context, the operator of an end-user computer uses a "browser" to view a published page received from a first web computer. The published page may have a "hyperlink hot spot", which, when activated, results in a call to a second web computer. More particularly, the published page may have the hyperlink hot spot "Keats", which, when activated, causes the transfer of control to a specified university computer with a file providing information on "English Poets".

Thus, each hyperlink hot spot knows the name of its associated file and on which computer that file is stored. The name of the computer and the file are combined into a Uniform Resource Locator (URL). A typical URL is http://SU/123. This URL is an instruction to retrieve the file 123 from the State University computer "SU" using a method called Hypertext Transport Protocol "HTTP". A URL may also be used to invoke a specified function on a remote computer, with the remote computer returning the results of the invoked and executed function.

Thus, when the hyperlink hot spot is selected, control is transferred across the WWW to the computer specified in the URL instruction. The computer then returns to the end-user computer the file specified in the URL instruction. Subsequently, the browser on the end-user computer is used to display the information associated with the file.

It is known in the art to use demographic information so that a reply to an inquiry from an end-user computer is tailored to the computer operator's interests. This technique is especially relevant in a commercial setting where a computer operator is accessing different computers to identify products of interest. For example, a computer operator may have relied upon hyperlink hot spots to connect to an on-line computer catalog. In this context, it can be appreciated that the owner of the on-line computer catalog would like to have demographic information on the computer operator so that the information sent to the computer operator is particularly relevant. For example, the information should only relate to Apple architecture computers and peripherals if the relevant demographic information specifies that this is the type of system that the computer operator uses.

One way to obtain demographic information is for a computer operator to register the demographic information at each web site that is visited. The obvious problem with this approach is that a user does not want to take the time to repeatedly provide demographic information.

Figure 1:
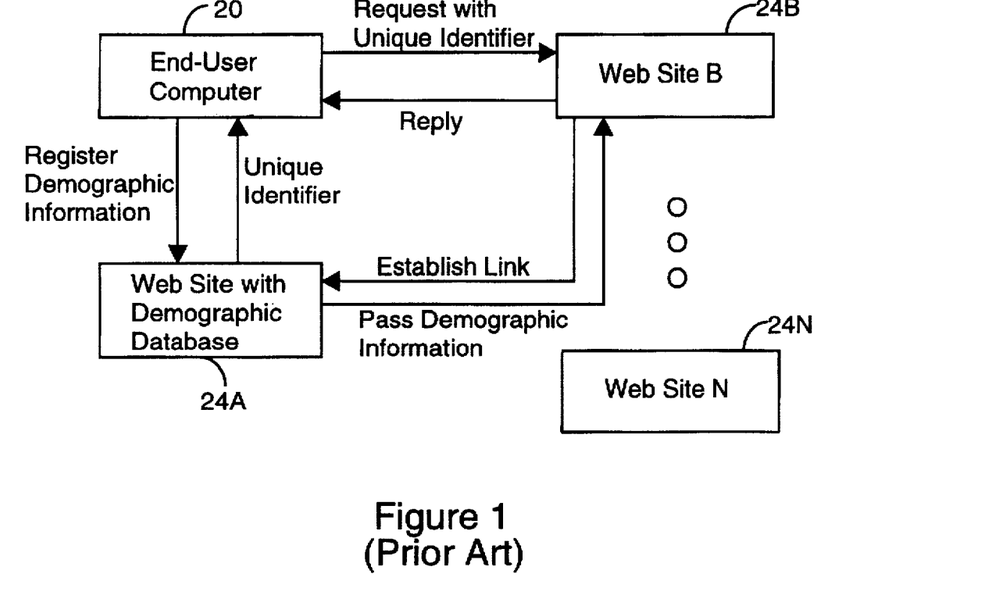
FIG. 1 illustrates a prior art system that uses demographic information to create a customized reply to a request for information.

A more sophisticated technique of utilizing demographic information is shown in FIG. 1. FIG. 1 illustrates a technique in which an operator of an end-user computer 20 registers demographic information at a web site demographic database 24A. After the registration process is completed, the web site demographic database 24A passes a unique identifier to the end-user computer 20. Subsequently, when the end-user computer 20 requests information from another computer on the WWW, say web site B, the unique identifier is passed to the computer with the request. In response to the request, the web site 24B establishes a communication link with the demographic database web site 24A. The unique identifier is then passed from the web site 24B to the demographic database website 24A. The demographic database website 24A uses the unique identifier as an address to locate the demographic information associated with the computer operator of end-user computer 20. This information is then passed back to the web site 24B. The web site 24B, relying upon the demographic information, then supplies a customized reply to the original request from the end-user computer 20.

There are a number of problems associated with the system of FIG. 1. First, the operator of the end-user computer 20 must pass a unique identifier to each web site that is called. Consequently, without the knowledge of the computer operator, it is possible to coordinate every web site that a computer operator visits. This potentially provides a great deal of information regarding the computer operator and his or her interests. Moreover, the demographic information about the individual is passed over communication links where it can be accessed, thereby providing more information on the computer operator. Most individuals view each of these scenarios as a potential invasion of privacy.

Another problem with the system of FIG. 1 is that a communication link must be established with the demographic database web site 24A each time a new web site is visited. Consequently, the system of FIG. 1 can be relatively slow.

In view of the foregoing, it would be highly advantageous to provide a simple technique for efficiently passing private demographic information between hyperlink destinations in a computer network.

SUMMARY OF THE INVENTION

The method of the invention passes demographic information between computers by associating a computer operator with a set of demographic information. When the computer operator requests a transfer to another computer, a remote site information repository is accessed to identify a remote site destination address and a remote site encryption key. The demographic information is then encrypted using the remote site encryption key to form an encoded demographic signal. The encoded demographic signal is then combined with the remote site destination address to form an encoded demographic hyperlink transfer request, which is used to access the remote computer specified by the remote site destination address. The remote computer decrypts the encoded demographic information.

There are a number of benefits associated with this technology. First, computers in a network are able to receive and process demographic information. This is achieved without requiting the computer operator to register at each site on the network. In addition, the demographic information is encoded when it is on public transmission channels. Thus, the information remains private. The encoding operation also promotes privacy to the extent that the information can only be processed by a computer that can decode the information.

The disclosed system avoids several of the pitfalls associated with the prior art system of FIG. 1. First, the disclosed system does not rely upon a unique identifier that can be used to trace the different locations that a computer operator visits. In addition, since demographic information is directly passed to a computer in the present invention, a separate communication session need not be initiated with a demographic database to obtain the information.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
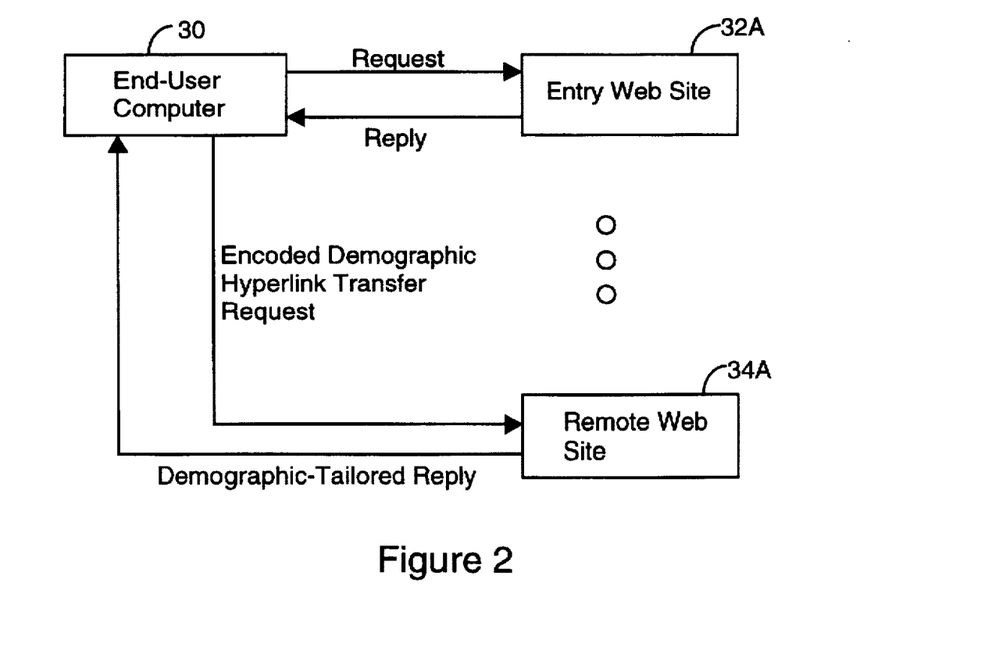
FIG. 2 illustrates a system for appending demographic information to a hyperlink transfer request, in accordance with one embodiment of the invention.

FIG. 2 is a general illustration showing the architecture and methodology of the system of the present invention. The system architecture includes an end-user computer 30 that generates a request that reaches an entry web site 32A. The request uses a Uniform Resource Locator (URL) address to specify a computer (entry web site 32A) and information (a file) at that computer.

The entry web site 32A is used to obtain demographic information about the computer operator at the end-user computer 30. That is, the entry web site 32A provides a set of inquiries or a graphical interface to obtain demographic information about the computer operator. Typical demographic information includes name, age, zip code, income level, employment information, type of computer used, other purchasing preferences, etc. This session also prompts the computer operator to select a password for use in future communications. The demographic information is then stored in a database at the entry web site 32A. In subsequent accesses to the entry web site 32A, the computer operator need not register again, instead the computer operator is recognized by providing authenticating information, such as a name and password.

After authentication or an initial registration session, the entry web site 32A provides a reply to the original inquiry. That is, the entry web site 32A passes back to the end-user computer 30 the file specified by the URL command. A browser running on the end-user computer 30 is used to display the file.

When the computer operator views the received file he or she may activate a hyperlink hot spot in the displayed document. This causes a new request 16 by sent to the entry web site 32A. The request is a hyperlink transfer request to a new computer, say remote web site 34A. The entry web site 32A correlates the request with the computer operator and then fetches the previously accumulated demographic information regarding the computer operator. The entry web site 32A also accesses a remote site information repository stored within the entry web site 32A. The remote site information repository includes a list of remote site destination addresses and corresponding remote site encryption keys. The remote site destination addresses include the URL addresses for the different computers within the system that may receive demographic information. Each remote site destination address has a corresponding remote site encryption key. The encryption key is used to encode the demographic information that is sent to a computer. When the information is received at the computer, the inverse key is used at the computer to decrypt the demographic information.

Thus, the reply from the entry web site 32A to the end-user computer 30 is a remote site destination address and demographic information encrypted by the selected remote site encryption key. This response is referred to as a demographic hyperlink transfer request. As shown in FIG. 2, the end-user computer 30 passes the returned demographic hyperlink transfer request to a remote web site 34A. The remote web site 34A has the address specified by the remote site destination address within the encoded demographic hyperlink transfer request.

The remote web site 34A is an associated web site in the system of FIG. 2. It is associated in the sense that it can process the demographic information that is passed to it. As indicated above, the entry web site 32A stores the address for each associated computer in the system.

The remote web site 34A uses the inverse of the same encryption key specified at the entry web site 32A to decrypt the received demographic information. That is, since it is an associated computer in the system of FIG. 2, it has a specified encryption key that is also stored at the entry web site 32A. Thus, when the remote web site 34A receives information, it can use the encryption key to decrypt the information that was encoded at the entry web site 32A.

Subsequently, the demographic information may be used to supply a demographic-tailored reply to the end-user computer 30. A demographic-tailored reply is a reply to a request from another computer that relies upon at least one piece of demographic information supplied by an encoded demographic hyperlink transfer request. The demographic-tailored reply relies upon this information by providing information that is consistent with the interests of an individual with the specified demographic information. The demographic information may also be used to obtain a profile of the type of computer operators that are accessing a particular computer.

In view of the foregoing general description of the invention, those skilled in the art will recognize a number of benefits associated with the disclosed technology. First, computers in a network are able to receive and process demographic information. This is achieved without requiring the computer operator to register at each site on the network. In addition, the demographic information is encoded when it is on public transmission channels. Thus, the information remains private. The encoding operation also promotes privacy to the extent that the information can only be processed by a computer that can decode the information. Thus, computers that are not registered at the entry web site 32A cannot process demographic information.

The disclosed system avoids several of the pitfalls associated with the prior art system of FIG. 1. First, the disclosed system does not rely upon a unique identifier that can be used to trace the different locations that a computer operator visits. In addition, since demographic information is directly passed to a computer, a separate communication session need not be initiated with a demographic database to obtain the information.

Figure 3:
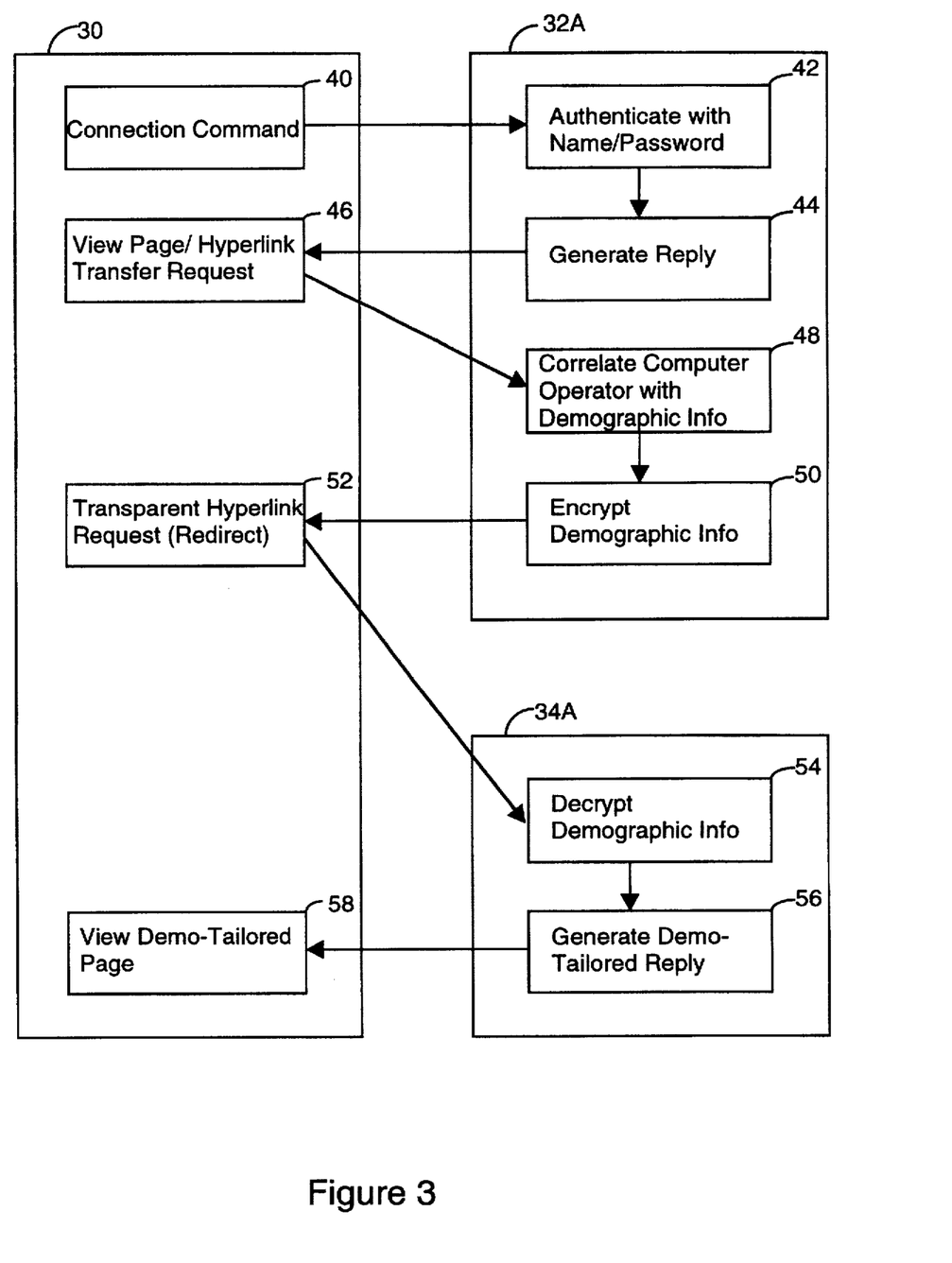
FIG. 3 is a more detailed illustration of the processing associated with the system of FIG. 2.

The general nature and benefits of the invention have now been disclosed. Attention presently turns to a more detailed discussion of the system of the invention. FIG. 3 illustrates end-user computer 30, entry web site 32A, and remote web site 34A. In particular, the figure shows the processing steps that are performed at each location. It should be appreciated that a system in accordance with the invention may have a large number of end-user computers 30, entry web sites 32A (say 32A–32N), and remote web sites 34A (say 34A–34N).

An entry web site 32 refers to a site at which demographic information is received. Otherwise, an entry web site 32 can be considered to be interchangeable with the remote web sites 34. That is, in a preferred embodiment, the entry web site 32 passes and receives encoded demographic information, just any other remote web site 34 in the system.

The first processing step shown in FIG. 3 is to make a connection (step 40) with the entry web site 32A. This is a standard connection step between an end-user computer 30 and a server computer 32. The first operation performed on the entry web site 32A is to authenticate the user with a name and password (step 42). This step may include a registration process, as discussed above. However, in this example, it will be assumed that the computer operator has already visited the entry web site 32A and therefore only an authentication operation is required.

The next operation performed by the computer 32A is to generate a reply (step 44). The reply is the file or other information requested from the computer 32A by the end-user computer 30. The reply is passed back to the end-user computer 30, where it is viewed (step 46). The reply, typically one or more pages displayed on a browser, includes one or more hyperlink hotspots. Activating a hyperlink hotspot causes a return of control to the entry web site machine 32A.

At this point, the entry web site machine 32A knows that there has been a request to access another computer. Thus, operations are performed so that when control is passed to the other computer, demographic information regarding the computer operator is available to the other computer. Specifically, a correlation operation is performed to match the computer operator with his or her corresponding demographic information (step 48). This correlation operation is executed by relying upon the information obtained during the authentication operation (block 42).

The next processing step is to encrypt the demographic information (step 50). The demographic information is encrypted by relying upon a remote site encryption key that is stored with a remote site destination address in a remote site information repository. Thus, the remote site information repository includes an address for each computer in the system and an encryption key for each address.

After the demographic information is encrypted with the retrieved encryption key, a transparent hyperlink request is sent to the end-user computer 30. The transparent hyperlink request includes the remote site destination address and the encoded demographic information. The end-user computer 30 automatically, without computer operator participation, processes the remote site destination address by calling the remote site computer specified by the remote site destination address, in this case, remote web site 34A. This automatic passing of information from a first server (32A), to an end-user computer (30), and to a second server (34A) is sometimes referred to as a "redirect".

The remote web site 34A decrypts the demographic information using the encryption key that it stores locally (step 54). Thus, the same encryption key is stored at the remote web site 34A and in the remote site information repository of entry web site 32A. The decrypted demographic information can be used in any number of ways. For instance, it can be used to gather profile information on computer operators accessing the remote web site 34A. FIG. 3 illustrates that the information is used to generate a demographic-tailored reply (step 56). As shown in FIG. 3, this reply is passed back to the end-user computer 30, where it is viewed by the computer operator (block 58).

Figure 4:
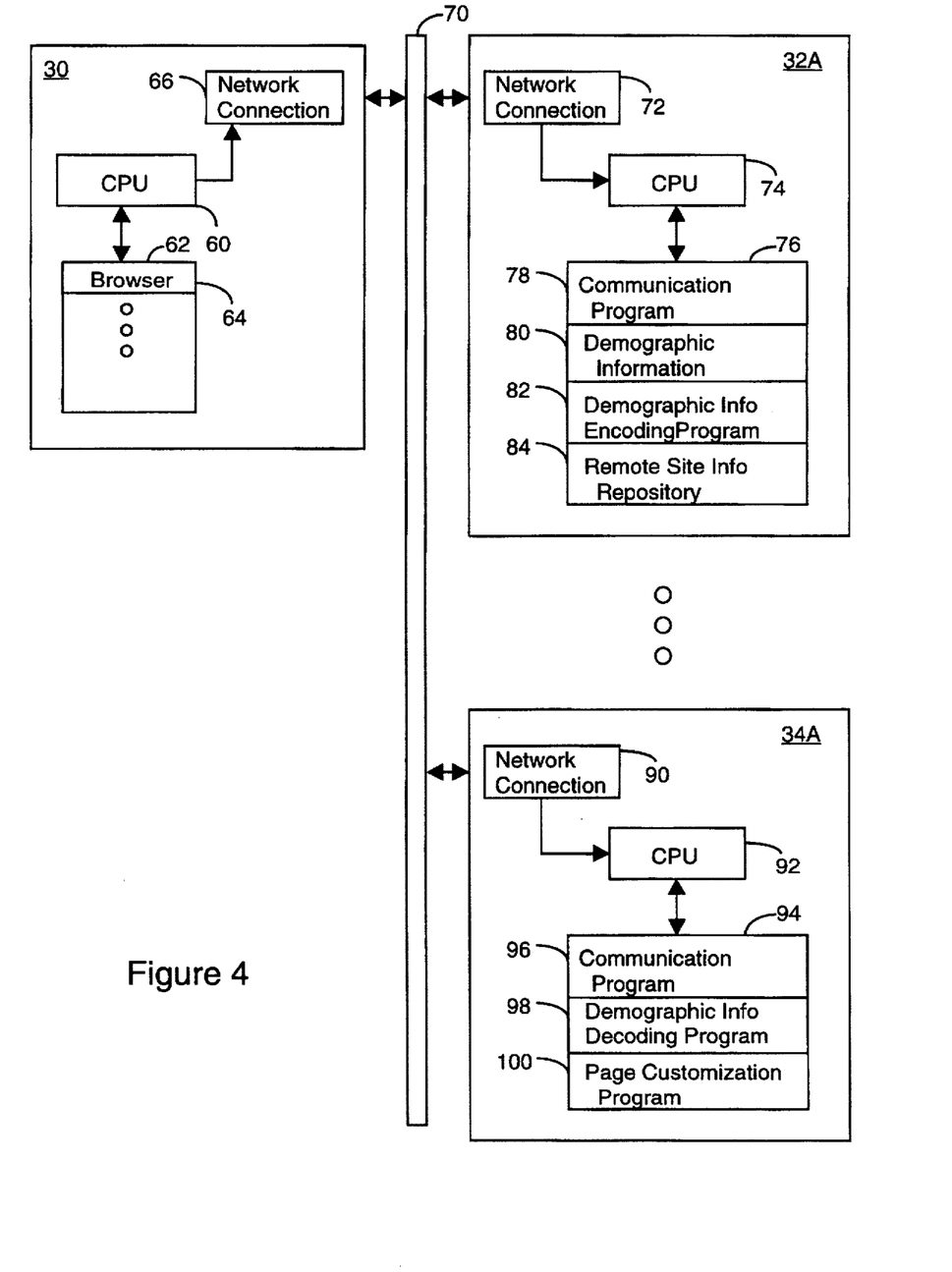
FIG. 4 illustrates a computer system configuration that may be used in accordance with the invention.

FIG. 4 illustrates the hardware elements that are used in practicing the invention. In the figure, it is seen that the end-user computer 30 includes a Central Processing Unit (CPU) 60 which is attached to a memory 62. The memory 62 stores a set of executable programs, including a browser program 64. As known in the art, the browser program 64 is used to access, communicate, and display information from other computers. The other computers are accessed through a network connection 66, which is linked to a transmission channel 70. The transmission channel 70 may be any wire or wireless communication network. The entry web site 32A is connected to the transmission channel 70. The entry web site 32A includes a network connection 72, which communicates with a CPU 74. The CPU 74 is connected to a memory 76, which stores a set of executable programs and data. The memory 76 stores a communication program 78 that is used to communicate with other computers connected to the transmission channel 70. The memory 76 also stores demographic information 80 on the different computer operators that have registered at the computer 32A. A demographic information encoding program 82 and a remote site information repository 84 are also stored in the memory 76. As will be described below, the demographic information encoding program 82 accesses the remote site information repository 84 for remote site destination addresses and remote site encryption keys. The program then uses this information to encrypt the demographic information 80 stored on a particular computer operator.

The system of FIG. 4 also includes a remote web site computer 34A. The remote web site computer 34A includes a network connection 90, a CPU 92, and a memory 94. The memory 94 stores a communication program 96 of the type previously described. In addition, the memory 94 stores a demographic information decoding program 98. This program uses the same encryption key and an inverse encryption operation to decode the incoming encrypted information. The remote web site computer 34A may also include a page customization program. As its name implies, this program uses the decoded demographic information to create a demographic-tailored reply to the incoming request for information.

Figure 5:
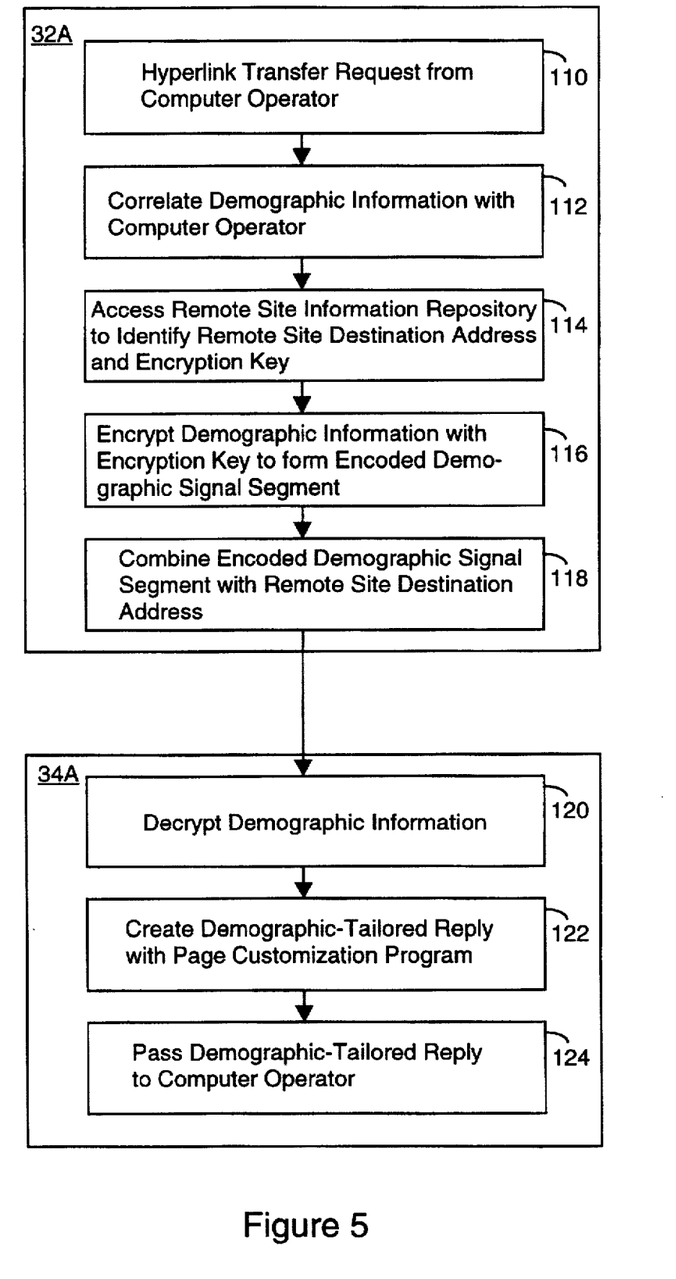
FIG. 5 illustrates the processing associated with the demographic information encoding and decoding programs used in accordance with an embodiment of the invention.

Turning now to FIG. 5, depicted therein is a more detailed representation of the processing performed by the entry web site 32A and remote web site 34A. The first step associated with this processing is that a hyperlink transfer request is obtained from a computer operator (step 110) at an end-user computer 30. For example, assume that a computer operator, U, at end-user computer 30 has previously been authenticated at an entry web site 32A called "cnet". Thereafter, the computer operator views, at the end-user computer 30, a page, provided by cnet, containing ads for computer peripherals. Each ad is associated with a different computer vendor running a separate server (remote web site). The computer operator then decides to obtain information from one of those servers, say the Internet Shopping Network (ISN), by clicking on the hyperlink hot spot for this location. This selection causes the following request: "http://www.cnet.com/cgi-bin/goto?isn" to be sent from the end-user computer 30 over the transmission channel 70 to the entry web site 32A (the cnet computer).

The entry web site 32A then uses the information received during the authentication operation to correlate demographic information with the computer operator (step 112). That is, demographic information, referred to as D, is correlated with the computer operator U.

Subsequently, the remote site information repository 84 is accessed (step 114) to identify the remote site destination address corresponding to the "isn" string. By way of example, this location is specified as "www.isn.com".

The repository 84 is also accessed (step 114) for the remote site encryption key (referred to as "K") corresponding to the "isn" string. Standard techniques are used to encode the demographic information using the remote site encryption key (step 116). This results in an encoded demographic signal segment, referred to as K(D). The encoded demographic signal segment is combined with the remote site destination address (step 118) to form an encoded demographic hyperlink transfer request, for example, of the following form: "Location:http://www.isn.com/new-user?K(D)".

The end-user computer 30 receives the encoded demographic hyperlink transfer request. The first term in the request is the word "Location" so the end-user computer 30 knows that a new location has been specified. The request also indicates that the "http" protocol should be used to connect with the computer "www.isn.com". With this information, standard techniques are used to access the remote web site 34A. At this site, processing is passed to the demographic information decoding program 98. The program 98 identifies the "new-user?" designation as a command to process the encoded demographic information "K(D)". The question mark symbol "?" is used in the HTTP protocol to indicate that additional information is appended to a command. In this case, the information is the encoded demographic information "K(D)".

The demographic information decoding program 98 decrypts the demographic information (step 120) by using the inverse of K to decrypt the information "D". This results in demographic information in a predetermined format. For example, the predetermined format may specify that the first bytes define a zip code, the next byte defines an age, etc. The demographic information can then be used to create a demographic-tailored reply (step 122) using the page customization program 100. The page customization program 100 may incorporate any set of instructions to process the demographic information, and in response thereto, select information for the tailored reply. The remote web site 34A then passes the demographic-tailored reply to the computer operator (step 124) at end-user computer 30.

Figure 6:
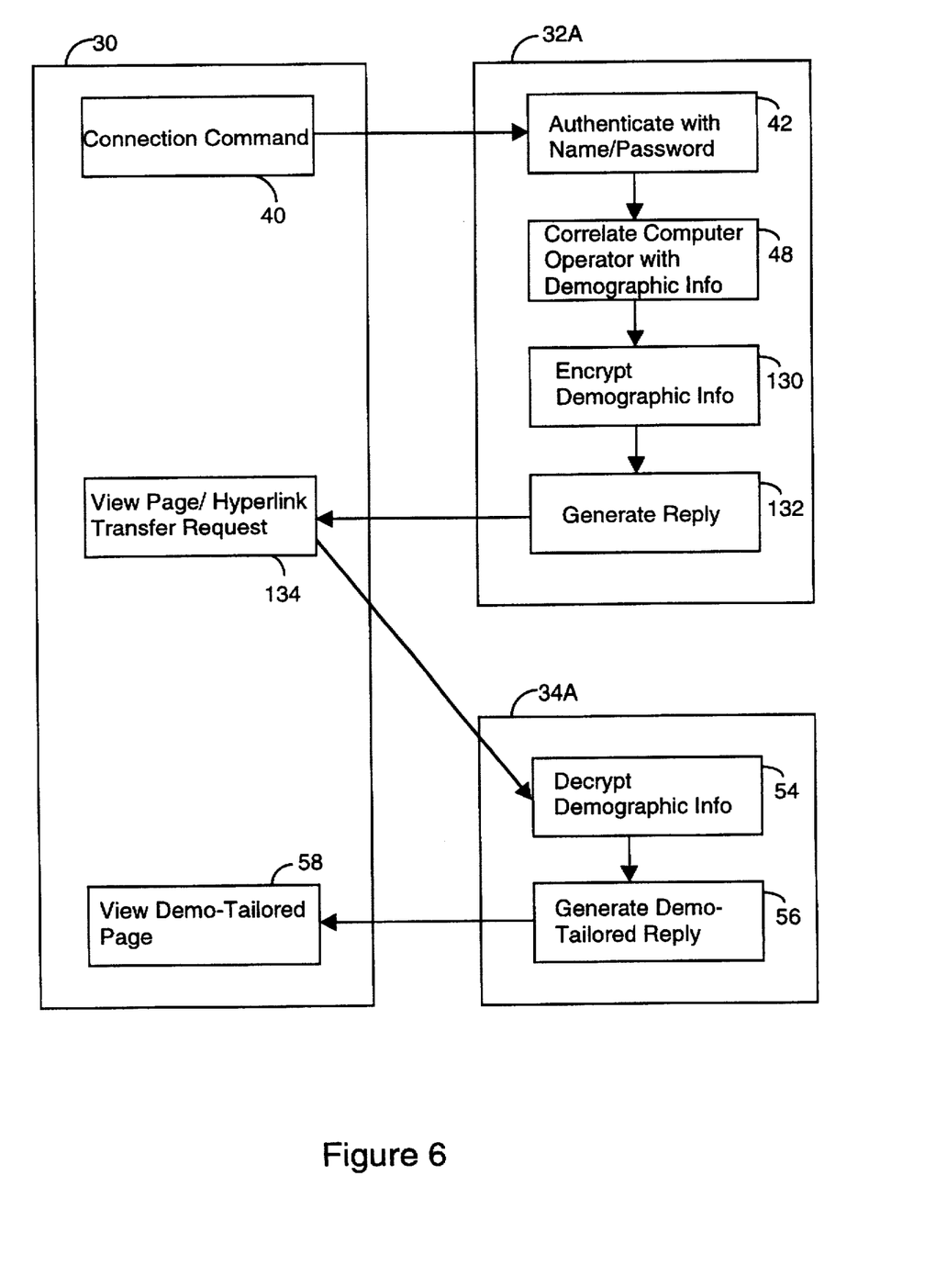
FIG. 6 is a detailed illustration of alternate processing steps that may be used in accordance with the system of FIG. 2.

FIG. 6 illustrates the processing associated with an alternate embodiment of the invention. In particular, FIG. 6 illustrates that each reply sent to an end-user computer 30 may include a page with all the information necessary to compute a hyperlink transfer request at the end-user computer 30. That is, the end-user computer 30 receives a page with a set of information embedded therein. The embedded information includes the remote site destination address for each hyperlink hot spot appearing in the page. In addition, the remote site destination address has a corresponding remote site encryption key to encrypt the demographic information which is also embedded into the page. Consequently, when a hyperlink hot spot is activated, an encoded demographic transfer request may be routed from the end-user computer 30, without returning to the entry web site 32A. The problem with this approach is that for each hyperlink hot spot in a page, the remote site destination address and remote site encryption key must be fetched. This requires more processing time. Moreover, since only one hyperlink hot spot can be activated on a page, information is gathered, but never used.

It will be clear to those skilled in the art that a variety of alternate configurations may be used in accordance with the disclosed technology. For instance, it is not important whether the remote site destination address is obtained before correlating the computer operator with the demographic information. In addition, the designation between an entry web site 32 and a remote web site 34 is somewhat arbitrary. An entry web site 32A may include a demographic information decoding program 98 and a page customization program 100. Similarly, it should be appreciated that a remote web site 34A may have a remote site information repository 84 and a demographic information encoding program 82 so that it can reconvey demographic information that it has received.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of passing demographic information between computers, said method comprising the steps of:

accessing, in response to a hyperlink transfer request generated by a computer operator at an end-user computer, a remote site information repository to identify a remote site destination address;

associating said computer operator with demographic information characterizing said computer operator;

combining said demographic information with said remote site destination address to form a demographic hyperlink transfer request;

passing said demographic hyperlink transfer request to said end-user computer; and redirecting said demographic hyperlink transfer request from said end-user computer to the remote computer specified by said remote site destination address.

2. The method of claim 1 wherein said accessing step includes the step of accessing said remote site information repository to identify a remote site encryption key.

3. The method of claim 2 further comprising the step of encrypting, after said associating step, said demographic information with said remote site encryption key to form an encrypted demographic signal.

4. The method of claim 3 wherein said combining step includes the step of combining said encrypted demographic signal with said remote site destination address to form said demographic hyperlink transfer request.

5. The method of claim 4 further comprising the step of decrypting, at said remote computer, said encrypted demographic signal with said remote site encryption key to obtain said demographic information.

6. The method of claim 5 further comprising the steps of:

creating a demographic-tailored reply to said hyperlink transfer request based upon said demographic information; and passing said demographic-tailored reply to said computer user at said end-user computer.

7. A method of passing demographic information between computers, said method comprising the steps of:

connecting an end-user computer to an entry site computer with an authentication operation identifying the computer operator on said end-user computer;

generating, at said end-user computer, a hyperlink transfer request to a remote site computer;

accessing, at said entry site computer, in response to said hyperlink transfer request, a remote site information repository to identify a remote site destination address and a remote site encryption key;

associating, at said entry site computer, demographic information characterizing said computer operator;

encrypting said demographic information with said remote site encryption key to form an encrypted demographic signal segment;

combining said encrypted demographic signal segment with said remote site destination address to form an encrypted demographic hyperlink transfer request;

delivering said encrypted demographic hyperlink transfer request to said end-user computer; and redirecting said encrypted demographic hyperlink transfer request to the remote computer specified by said remote site destination address.

8. The method of claim 7 further comprising the step of decrypting, at said remote site computer, said encrypted demographic signal segment with said remote site encryption key to obtain said demographic information.

9. The method of claim 8 further comprising the steps of:

creating a demographic-tailored reply to said hyperlink transfer request based upon said demographic information; and passing said demographic-tailored reply to said end-user computer.

10. The method of claim 8 further comprising, prior to said connecting step, the step of registering said computer operator at said entry site computer, said registering step including the step of said computer operator providing said demographic information to said entry site computer.

11. A method of passing demographic information between computers, said method comprising the steps of:

associating a computer operator from an end-user computer with demographic information;

preparing a data file with a selectable computer transfer instruction embedded therein;

combining said demographic information with a remote site destination address for said selectable computer transfer instruction to form a hyperlink transfer request associated with said selectable computer transfer instruction; and passing said data file to said end-user computer to allow said end-user computer to select said selectable computer transfer instruction on said data file such that said hyperlink transfer request is passed to the remote computer specified by said remote site destination address.

12. The method of claim 11 wherein said combining step includes the step of encrypting said demographic information.

13. The method of claim 12 further comprising the step of decrypting said demographic information at said remote computer.

14. A method executed by a computer under the control of a program, said computer including a memory for storing said program, said method comprising the steps of:

storing in said computer a list of remote site destination addresses;

receiving in said computer demographic information corresponding to a computer operator;

matching, in response to a hyperlink transfer request generated by said computer operator, a transfer address with an address in said list of remote site destination addresses to form a remote site destination address;

combining said demographic information with said remote site destination address to form a demographic hyperlink transfer request; and passing said demographic hyperlink transfer request to said computer operator at an end-user computer, such that said end-user computer accesses the remote computer specified by said remote site destination address.

15. The method of claim 14 further comprising the step of storing in said computer a list of remote site encryption keys corresponding to said remote site destination addresses.

16. The method of claim 15 further comprising the step of encrypting, after said matching step, said demographic information with a selected remote site encryption key to form an encrypted demographic signal.

17. The method of claim 16 further comprising the step of combining said encrypted demographic signal segment with said remote site destination address to form said demographic hyperlink transfer request.

18. A computer readable memory to direct a computer to function in a specified manner, comprising:

a list of remote site destination addresses stored in said memory;

demographic information on a computer operator stored in said memory; and executable instructions stored in said memory, said executable instructions including:

(1) instructions to match a transfer address from a hyperlink transfer address with a selected remote site destination address in said list of remote site destination addresses;

(2) instructions to combine said demographic information with said selected remote site destination address to form a demographic hyperlink transfer request; and (3) instructions to pass said demographic hyperlink transfer request to said computer operator at an end-user computer, so that said end-user computer can access the remote computer specified by said remote site destination address.

19. The computer readable memory of claim 18 further including a list, stored in said memory, of remote site encryption keys corresponding to said remote site destination addresses.

20. The computer readable memory of claim 19 further including instructions to encrypt, after step (1), said demographic information with a selected remote site encryption key to form an encrypted demographic signal.

21. The computer readable memory of claim 20 further including instructions to combine said encrypted demographic signal segment with said remote site destination address to form said demographic hyperlink transfer request.

* * * * *